Nov. 6, 1928.
J. MIHALYI
1,690,589
PROJECTION SYSTEM FOR COLOR MOTION PICTURES
Filed May 11, 1927      2 Sheets-Sheet 1
FIG - 1 -
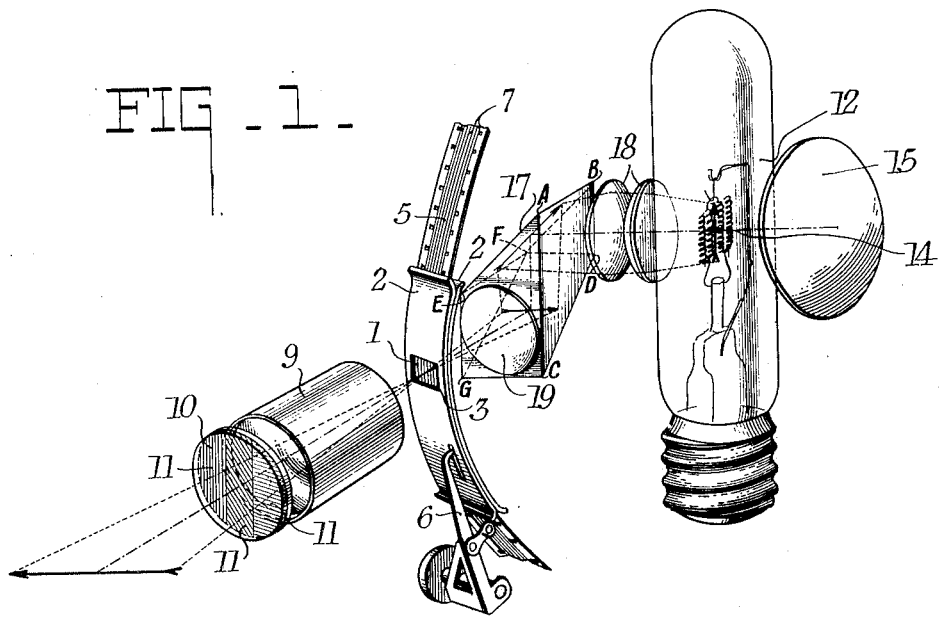
FIG - 2 -
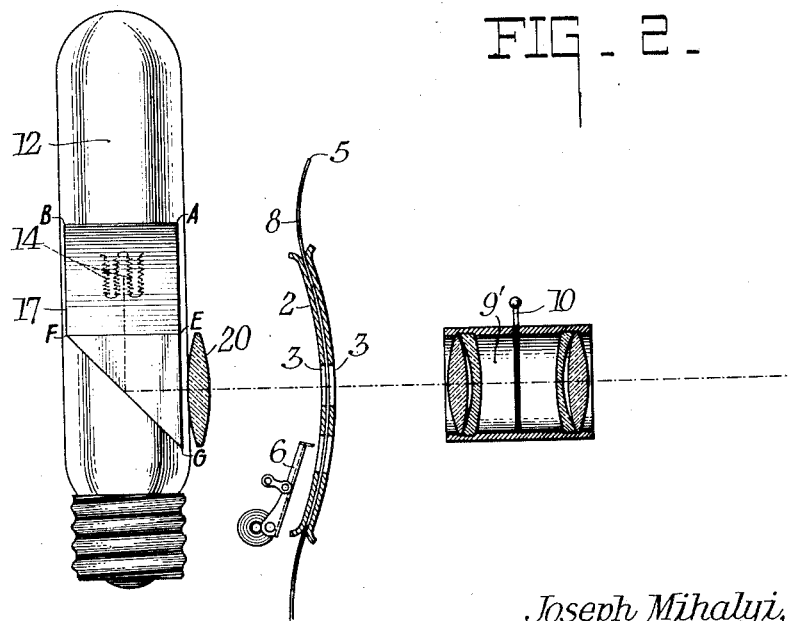
Joseph Mihalyi,
INVENTOR,
BY R. L. Stinchfield
N. M. Perrins
ATTORNEYS.

Nov. 6, 1928.
J. MIHALYI
1,690,589
PROJECTION SYSTEM FOR COLOR MOTION PICTURES
Filed May 11, 1927
2 Sheets-Sheet 2
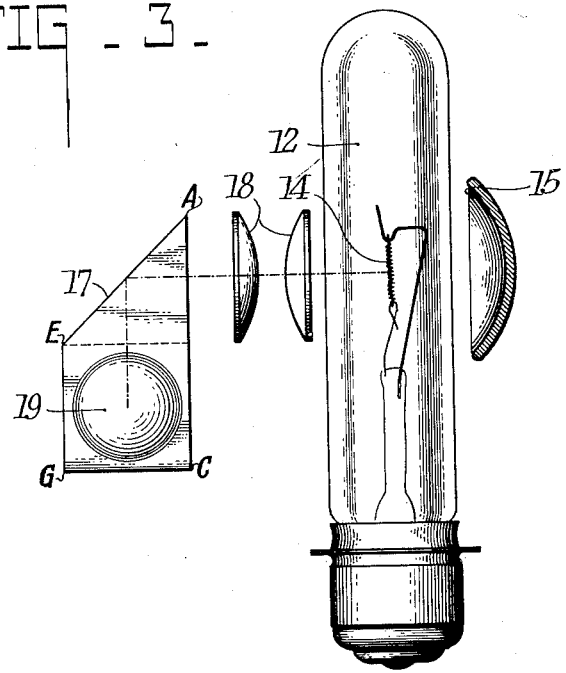
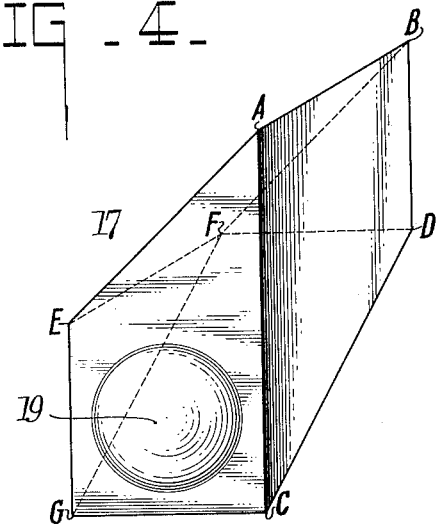
Joseph Mihalyi, INVENTOR,
BY
ATTORNEYS.

Patented Nov. 6, 1928.

1,690,589

UNITED STATES PATENT OFFICE.

JOSEPH MIHALYI, OF ROCHESTER, NEW YORK, ASSIGNOR TO EASTMAN KODAK COMPANY, OF ROCHESTER, NEW YORK, A CORPORATION OF NEW YORK.

PROJECTION SYSTEM FOR COLOR MOTION PICTURES.

Application filed May 11, 1927. Serial No. 190,508.

This application relates to a projector for color motion pictures and particularly to a projector for use in connection with the process disclosed in the United States Patent to Berthon, 992,151, granted May 16, 1911.

This process involves the placing of a multicolor filter at the objective and the use of an element having lenticular protuberances on the surface facing the objective and carrying a photographic layer on the rear surface. As is disclosed in the patent, the lenticular elements may be ridges or semicylinders, and when this is the case the filter should comprise bands parallel to the clyinders. When this process has been utilized in motion pictures, it has been found desirable for manufacturing reasons to form these cylinders parallel to the length of the film. For practical reasons it is also desirable that the film should pass through the projection gate vertically, as from top to bottom, rather than from side to side. It is, therefore, necessary that the color bands should be vertical.

In projecting such pictures in small portable projectors, the most available lamps are found to be incandescent electric lamps with vertical filaments, which can be satisfactorily and dependably used only with the filaments vertical. Thus, the lamp filaments, the ridges and bands are all vertical. The lamps should be accurately positioned in the optical system so that the projected images of the filaments themselves, and of the images reflected from the mirror behind the lamp will appear in a staggered relation, practically filling the field with a uniform illumination. These projected light source images are focused in the immediate neighborhood of the filter at the objective.

In order to produce this evenly illuminated image field it is necessary that the lamp be very accurately focused. This is a delicate adjustment, difficult for an amateur to perform in replacing used lamps. The result of maladjustment is the formation of light bands at or near the filter. If these light bands are parallel to the filter bands, the latter will not be evenly illuminated and the resultant image will not carry the colors in their correct ratio, thus producing an image with incorrect color rendering.

If, however, the projected light bands are perpendicular to and cross the filter bands, each filter band will receive the correct proportion of light and the color rendering in the resultant projected image will be correct. The illumination of the film itself is not so subject to unevenness as it is not near the focus of the condenser system.

I have found that by introducing into the condenser system, between the lamp and the gate, a reflecting system, such as a Porro prism, capable of rotating the image through ninety degrees, the necessity of delicate adjustment of the lamp is largely overcome and pictures with satisfactory color balance can readily be projected.

In order to explain my invention more clearly, reference will now be made to the accompanying drawing wherein like reference characters designate like parts throughout; and in which—

Fig. 1 is a diagrammatic view from an angle showing the whole optical projection system.

Fig. 2 is a diagrammatic side view of the projection system with slight modifications;

Fig. 3 is a diagrammatic front view of the illumination system only; and

Fig. 4 is a perspective view of the prism only viewed from the same angle as in Figure 1.

In the above figures it is to be understood that the details of the mechanical parts are omitted, not constituting a part of my invention. As shown, this improved system is particularly applicable to a projector of the type disclosed in the U. S. application of Capstaff, Serial No. 10,601, filed Feb. 20, 1925.

The film gate is here indicated at 1 and it is shown as comprising two arcuate members 2 having registering windows 3 between which passes a film 5, which is moved intermittently by any suitable mechanism, one of a claw type being indicated at 6. The film 5 is a long strip having the transparent base of a cellulosic compound, the front surface having minute longitudinal, convex ridges 7 or semi-cylinders and the rear surface having a layer 8 with a photographic image therein made by the process of the said Berthon patent. The film is shown on a much magnified scale, particularly the protuberances.

In front of this gate and in optical alignment with the windows, is a projection objective 9 associated with which is a color filter 10 suitable for the process and consisting of three colored parallel vertical bands 11, which may be blue, green, and red respectively.

The gate is illuminated by a lamp 12 the filament of which is of the type comprising separated vertical bands 14. Behind the lamp is a mirror 15 and between the lamp and the gate is a condensing system. This system includes a reflecting system capable of rotating the image ninety degrees. As here shown a Porro prism 17 is used with condensing lenses 18. The emergent surface of the prism may be curved as by cementing thereto a plano convex lens 19 as shown in Fig. 1, or it may be plane and a separated lens 20 used as shown in Fig. 2.

The position of the filter will be determined by the requirements of the particular system. In an ideal system the filter should be at the front gauss point of the objective and the condenser should concentrate or focus the light from the filaments with even illumination at or near this same point. In practice this condition may be somewhat departed from with satisfactory results. The filter should, however, subtend at the filter the same angle as was there subtended by the filter of the taking camera.

In Fig. 1, the filter 10 is shown as positioned in front of objective 9 while in Fig. 2 it is shown as positioned between the components of objective 9'.

For the purpose of clearness the path of limiting rays from an upright arrow positioned at the filament position is shown in Fig. 1. The rays will pass through the first condenser elements 18, enter plane surface A B C D of the prism, be reflected downwardly by the inclined surface A B E F to the second inclined surface C D F G, and emerge from surface A C E G and the final lens element 19 or 20, the beam being brought to a focus at or near the filter. As is evident the image will be horizontal.

As was pointed out above, the actual image to be focused by the condenser system is that of the filaments 14 with the images thereof reflected back by mirror 15 to the spaces between the filaments. This furnishes a substantially uniform field. Any bands due to incorrect positioning of the filaments 14 would be vertical and the images projected through the system would tend to illuminate certain of the filter bands 11 more than others. When by my improved system the images are horizontal at the filter, the several filter bands 11 would be illuminated to substantially the same extent and the color balance would be unaffected, even if the filaments were so out of place as to cause a visibly banded image. At the same time, the cone of light passing through the gate is far enough from the focal point of the condenser system to illuminate the gate with satisfactory uniformity.

The above described form is by way of example and I contemplate as included within my invention all such modifications and equivalents as fall within the scope of the appended claims.

Having thus described my invention, what I claim as new and desire to secure by Letters Patent is:

1. In a projector, a projection gate, a vertically banded light source behind said gate, a projection objective in front of said gate, a filter comprising vertical color bands associated with said objective, and a condensing system between the light source and the gate, and adapted to project an image of the light source through the gate to the filter, and including reflecting surfaces positioned to rotate an image of the banded light source through a vertical angle of ninety degrees, whereby the light bands will appear to be horizontal.

2. In a projector, a projection gate, a vertically banded light source behind said gate, a projection objective in front of said gate, a filter comprising vertical color bands associated with said objective, and a condensing system between the light source and the gate, and adapted to project an image of the light source through the gate to the filter, and including a Porro prism whereby the image of the banded light source will be rotated to appear horizontal.

3. In combination, a projection gate, a transparent element at said gate having on its front surface a series of minute, parallel, vertical ridges, and on its rear surface photographic images corresponding to said ridges, a projection objective in front of and in optical alignment with the gate, a filter associated with said objective and comprising vertical color bands, a vertically banded light source behind said gate, and a condensing system between said source and said gate and including a reflecting prism of a type to rotate the images of such banded light source through a vertical angle of ninety degrees, whereby the bands of the light source will appear to be horizontal at the gate.

4. In combination, a projection gate, a transparent element at said gate having on its front surface a series of minute, parallel, vertical ridges, and on its rear surface photographic images corresponding to said ridges, a projection objective in front of and in optical alignment with the gate, a filter associated with said objective and comprising vertical color bands, a vertically banded light source behind the gate, and a condensing system between said source and said gate and adapted to project an image of said light source through the gate to the filter and including a Porro prism whereby the projected beam will be rotated through a vertical angle of ninety degrees and the bands of the light source will appear horizontal at the filter.

Signed at Rochester, New York, this 6th day of May 1927.

JOSEPH MIHALYI.